(12) United States Patent
Bement et al.

(10) Patent No.: US 6,714,377 B2
(45) Date of Patent: Mar. 30, 2004

(54) DATA STORAGE DEVICE OPERATED FOR REDUCED SLIDING CONTACT

(75) Inventors: Gary Edwin Bement, Frederick, CO (US); Mark Andrew Chapin, Louisville, CO (US); Michael David Mundt, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 228 days.

(21) Appl. No.: 09/919,236

(22) Filed: Jul. 31, 2001

(65) Prior Publication Data

US 2002/0063983 A1 May 30, 2002

Related U.S. Application Data

(60) Provisional application No. 60/253,182, filed on Nov. 27, 2000.

(51) Int. Cl.[7] ................ G11B 21/02; G11B 27/36
(52) U.S. Cl. .................... 360/75; 360/31; 360/53; 360/73.03
(58) Field of Search ................ 360/31, 53, 75, 360/77.02, 97.01, 98.01, 99.02, 99.06, 78.04, 73.03, 73.02, 76

(56) References Cited

U.S. PATENT DOCUMENTS

| | | | | |
|---|---|---|---|---|
| 4,605,979 A | * | 8/1986 | Inoue et al. | 360/254.3 |
| 4,684,913 A | | 8/1987 | Yaeger | |
| 4,933,785 A | * | 6/1990 | Morehouse et al. | 360/78.04 |
| 5,060,099 A | * | 10/1991 | Yaeger et al. | 360/254.5 |
| 5,307,224 A | | 4/1994 | Minase | |
| 5,390,059 A | | 2/1995 | Tokuyama et al. | |
| 5,455,723 A | * | 10/1995 | Boutaghou et al. | 360/75 |
| 5,463,514 A | | 10/1995 | Yaeger | |
| 5,808,837 A | | 9/1998 | Norton | |
| 5,943,189 A | * | 8/1999 | Boutaghou et al. | 360/234.7 |
| 5,973,870 A | * | 10/1999 | Boutaghou et al. | 360/53 |
| 5,995,332 A | | 11/1999 | Patterson | |
| 6,067,208 A | * | 5/2000 | Segar | 360/254.5 |
| 6,134,069 A | * | 10/2000 | Catalano et al. | 360/75 |
| 6,134,076 A | * | 10/2000 | Boutaghou et al. | 360/254.5 |
| 6,134,077 A | * | 10/2000 | Misso et al. | 360/256 |
| 6,141,173 A | | 10/2000 | Kitazaki et al. | |
| 6,163,415 A | | 12/2000 | Lee et al. | |
| 6,229,663 B1 | | 5/2001 | Yoneda et al. | |
| 6,233,121 B1 | | 5/2001 | Pan | |
| 6,243,222 B1 | * | 6/2001 | Boutaghou et al. | 360/73.03 |
| 6,587,301 B1 | * | 7/2003 | Smith | 360/75 |

\* cited by examiner

*Primary Examiner*—David Hudspeth
*Assistant Examiner*—Natalia Figueroa
(74) *Attorney, Agent, or Firm*—Derek J. Berger

(57) ABSTRACT

A data storage device includes a disc stack, a rotary actuator having an arm coupled to a transducer head, and support structure for receiving the arm with a reduced incidence of sliding contact therewith. The arm is separated from the support means, and then moved so that the head is above a disc surface for storing data. After the disc stack reaches its nominal rotation speed, the head is loaded so that it can transfer data. During periods of non-activity, the head is raised (unloaded) again and the arm is placed on the support means. This reduces a risk of damage in the presence of shocks while minimizing particle generation induced by friction.

21 Claims, 3 Drawing Sheets

DATA STORAGE DEVICE OPERATED FOR REDUCED SLIDING CONTACT

RELATED APPLICATIONS

This application claims priority of U.S. provisional application Serial Number 60/253,182 filed Nov. 27, 2000.

FIELD OF THE INVENTION

The present invention relates to the field of mass storage devices. More particularly, this invention relates to loading and unloading sliders in a data storage device.

BACKGROUND OF THE INVENTION

One of the key components of any computer system is a place to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically housed within a small ceramic block. The small ceramic block is passed over the disc in a transducing relationship with the disc. The transducer can be used to read information representing data from the disc or write information representing data to the disc. When the disc is operating, the disc is usually spinning at relatively high revolutions per minute ("RPM"). These days common rotational speeds are 7200 RPM. Rotational speeds in high performance disc drives are as high as 15,000 RPM. Higher rotational speeds are contemplated for the future. These high rotational speeds place the small ceramic block in high air speeds. The small ceramic block, also referred to as a slider, is usually aerodynamically designed so that it flies over the disc. The slider has an air bearing surface ("ABS") which includes rails and a cavity between the rails. The air bearing surface is that portion of the slider that is nearest the disc as the disc drive is operating. When the disc rotates, air is dragged between the rails and the disc surface causing pressure, which forces the head away from the disc. At the same time, the air rushing past the depression in the air bearing surface produces a negative pressure area at the depression. The negative pressure or suction counteracts the pressure produced at the rails. The different forces produced counteract and ultimately fly over the surface of the disc at a particular fly height. The fly height is the thickness of the air lubrication film or the distance between the disc surface and the head. This film eliminates the friction and resulting wear that would occur if the transducing head and disc were in mechanical contact during disc rotation.

The best performance of the disc drive results when the ceramic block is flown as closely to the surface of the disc as possible. Today's small ceramic block or slider is designed to fly on a very thin layer of gas or air. In operation, the distance between the small ceramic block and the disc is very small. Currently "fly" heights are about 1–2 microinches or less. In some disc drives, the ceramic block does not fly on a cushion of air but rather passes through a layer of lubricant on the disc. A flexure is attached to the load spring and to the slider. The flexure allows the slider to pitch and roll so that the slider can accommodate various differences in tolerance and remain in close proximity to the disc.

Information representative of data is stored on the surface of the memory disc. Disc drive systems read and write information stored on tracks on memory discs. Transducers, in the form of read/write heads attached to the sliders, located on both sides of the memory disc, read and write information on the memory discs when the transducers are accurately positioned over one of the designated tracks on the surface of the memory disc. The transducer is also said to be moved to a target track. As the memory disc spins and the read/write head is accurately positioned above a target track, the read/write head can store data onto a track by writing information representative of data onto the memory disc. Similarly, reading data on a memory disc is accomplished by positioning the read/write head above a target track and reading the stored material on the memory disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

One of the most critical times during the operation of a disc drive occurs just before the disc drive shuts down or during the initial moment when the disc drive starts. When shutdown occurs, the small ceramic block or slider is typically flying over the disc at a very low height. In the past, the small block or slider was moved to a non-data area of the disc where it literally landed and skidded to a stop. Problems arise in such a system. Such a system is adequate for disc drives that had textured disc surfaces and which rotated at less than 7200 RPM. To improve magnetic performance, discs now are formed with a smooth surface. To improve access times, disc stacks are now rotated at speeds of 15,000 RPM in a high performance disc drive. Stiction, which is static friction, occurs between the air bearing surface of the slider and the smooth disc surface. Forces from stiction, in some instances, can be high enough to separate the slider from the suspension. When the disc is rotated at 15,000 RPM, the velocity between the slider and disc is high. At high velocity, the kinetic energy that must be dissipated when a contact between the disc and slider occurs is so high that particle generation is a distinct possibility. Still another problem is that landing a slider on the disc may limit the life of the disc drive. Each time the drive is turned off another contact start stop cycle occurs subjecting the slider to another high impact force which may cause the slider to chip or generate particles. The generated particles could eventually cause a head crash in the disc drive.

To overcome the stiction problem and to provide for a much more rugged design for disc drives used in mobile computers, such as portable computers and notebook computers, disc drive designers began unloading the sliders onto a ramp positioned on the edge of the disc. Disc drives with ramps are well known in the art. Such configurations are exemplified in U.S. Pat. 6,243,222 ("Load/Unload Method for Sliders in a High Speed Disk Drive") issued Jun. 5, 2001 to Zine Eddine Boutaghou et al., also assigned to Seagate Technology LLC.

Conventionally, a portion of the ramp is positioned over the disc. Before power is actually shut off, the actuator assembly moves the suspension, slider and transducer to a park position on the ramp. Commonly, this procedure is referred to as unloading the heads. Unloading the heads helps to insure that data on the disc is preserved since, at times, unwanted contact between the slider and the disc results in data loss on the disc. When starting up the disc drive, the process is reversed. In other words, the suspension and slider are moved from the ramp onto the surface of the disc and into a transducing position. This is referred to as loading the heads or sliders onto the disc.

Use of a ramp to load and unload the disc overcomes many aspects of the stiction problem. However, during the loading process and the unloading process, it seems that it is fairly common for the slider to contact the disc. In such situations, high friction forces can develop between the head and the disc. The high friction forces can cause slider and media damage. The contact with the disc in the disc stack rotated at 15,000 RPM or higher still has the potential to cause damage. Some manufacturer's simply sacrifice the portion of the disc at the outer diameter and devoted that space for loading and unloading to and from the disc. In other words, data is not kept at the outer diameter of the disc so that if disc contact occurs there is no possibility of losing data from damage to the disc. This design strategy is suboptimal. First of all, the area of the disc where the most information representative of data can be stored is the outer diameter of the disc. Giving up the outer diameter is like giving up the best located and most valuable real estate when developing a parcel of land. In addition, slider and disc contact will still occur and this could eventually generate particles and cause a disc crash. The damage is greater at higher rotational speeds of the discs in the disc drives. Thus, this problem will only get worse as higher RPM design points are set.

What is needed is a better way to improve non-operating shock performance while generating particles at a lower rate. It is to this and other problems that the present invention is directed.

SUMMARY OF THE INVENTION

The present invention provides a method and apparatus for a reduced sliding contact upon an actuator of a data storage device. One embodiment includes a disc stack, a rotary actuator having an arm coupled to a transducer head, and support means for receiving the arm with a reduced incidence of sliding contact therewith.

Another embodiment includes several steps performed while rotating the disc stack. The arm is separated from the support means, and then moved so that the head is above a disc surface for storing data. The head is then loaded so that it can transfer data. During periods of non-activity, the head is raised (unloaded) again and the arm is placed on the support means. This reduces a risk of damage in the presence of shocks while minimizing a rate of friction-induced particle generation.

Additional features and benefits will become apparent upon a review of the following drawings and the corresponding detailed description.

DETAILED DESCRIPTION

Definitions of certain terms are provided in conjunction with the descriptions below, all consistent with common usage in the art but some described with greater specificity. For example, a "usable disc surface" refers to an annular band bounded by the outer circumference of the disc and by an inner-diameter obstacle such as a disc clamp or spacer. It should be noted that devices of the present invention preferably do not waste usable disc surface on texturing and/or ramp overlap.

As used herein, sliding contact upon an actuator arm or head is "substantial" only if it is a non-intermittent and necessary part of the arm or head's operation lasting more than about 10 microseconds during a typical start or stop operation. Conventional ramp unloads and contact stops require substantial contact, typically generating huge numbers of particles large enough to interfere with head operation.

Figure 1:
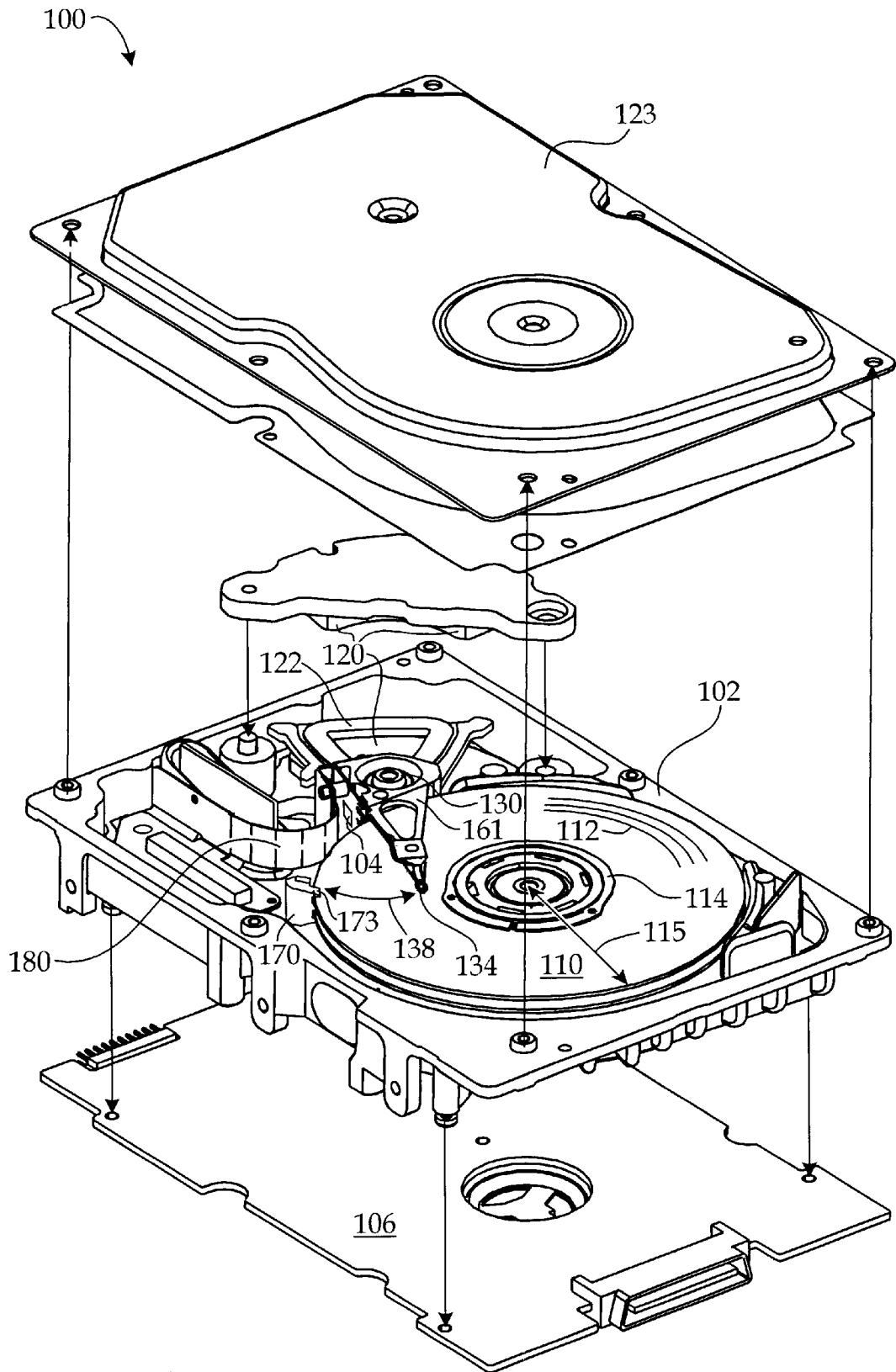
FIG. 1 shows an exploded view of a Winchester-type disc drive in which the present invention is particularly useful.

Turning now to the drawings and specifically to FIG. 1, shown is an exploded view of a disc drive 100 in which the present invention is particularly useful. The disc drive 100 includes a base member 102 to which all other components are directly or indirectly mounted and a top cover 123 which, together with the base member 102, forms a disc drive housing which encloses delicate internal components and isolates these components from external contaminants.

The disc drive includes a plurality of discs 110 each having a radius 115 (e.g. 1.75") which are mounted for rotation on a spindle motor (not shown). The discs are arranged in a conventional rotatable stack and are held in their respective positions by a clamp 114 (above) and spacers (between, not shown). The discs 110 include on their surfaces a plurality of circular, concentric data tracks 112 on which data is recorded via an array of vertically aligned head assemblies (one of which is shown at 134). The head assemblies 134 are supported by arm portions 161 of actuator 130. Head assemblies 134 are constructed to fly on a thin air bearing above each respective disc data surface. (In this context, a frame of reference is defined by each disc data surface being "horizontal," irrespective of the planet's position.)

Figure 2:
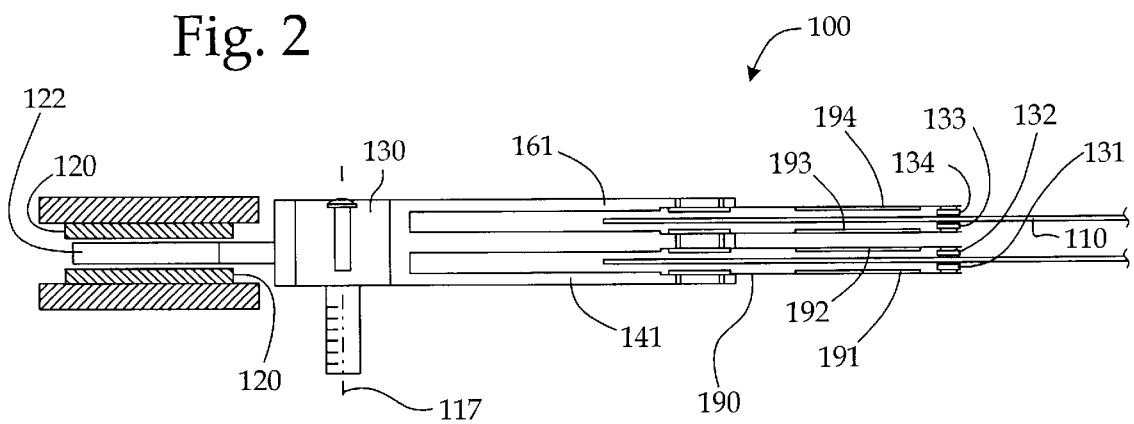
FIG. 2 shows a side view of the disc drive of FIG. 1 highlighting the arrangement of the actuator assembly relative to the discs.

Actuator 130 also includes coil 122, which is part of a voice coil motor (VCM) that rotates actuator 130 relative to the base member 102. The VCM also includes permanent magnets 120 that provide a magnetic field surrounding the VCM coil 122. Actuator 130 is pivotable about an axis 117 as shown in FIG. 2 so that head 134 is positionable throughout a range of motion 138 across the tracks 112 of the disc 110. When the disc drive 100 is to be powered down, the actuator 130 moves to its park position where head 134 is near the outer diameter of the disc 110.

Base 102 includes a support member 170 with tapered tabs 173 that protrude between, above and below the discs 110 by a short horizontal distance (i.e. by less than the nominal disc thickness). These tabs 173 do not ordinarily contact the discs 110, but a large disturbance on the discs will cause an outermost edge of the discs to collide with the tabs 173 before they build up much speed. The tabs are constructed and arranged to snub disturbances on the discs larger than a predetermined threshold distance roughly twice a typical disc flutter magnitude and less than the nominal disc thickness.

Unlike ramp or cam devices of the prior art, however, the horizontally protruding tabs 173 are not constructed so that any part of actuator 130 can contact them. Rather, the arms contact the support member 170 only after the heads 134 are lifted from the disc surface and moved outside the outer edge of the discs 110. This is possible by virtue of lift actuators shown in more detail in FIG. 2.

Electronic circuitry to control the operation of the disc drive 100 is provided on controller board 106, which is coupled to each head 134 through preamplifier circuit 104. Controller board 106 is coupled to preamp 104 and VCM coil 122 through flex circuit 180, which is constructed to minimize mechanical bias forces acting on actuator 130.

Turning now to FIG. 2, there is shown a side view of disc drive 100 highlighting the arrangement of actuator 130 relative to the discs 110. Each of four heads 131,132,133, 134 is supported above its respective data surface by a respective arm 190. In addition to arm portion 141 of actuator 130, as shown, arm 190 includes a load beam with a shape memory alloy strip 191 deposited on its upper side. When enough electricity passes through strip 191 so that it heats up by at least 3–10 degrees C., the strip shortens and head 131 approaches its respective data surface more closely. Each head 131,132,133,134 has a fly height that is thus controllable by a respective strip 191,192,193,194 that functions as a thermal lift actuator.

In an alternative embodiment, a conductive strip of a metal that expands upon heating is applied on a side of each arm opposite the side on which the head is mounted. Like the embodiment shown, this alternative bimetallic strip configuration decreases each head's fly height when powered.

In another alternative embodiment, the arm includes a distal load tang that extends horizontally beyond the head. A suitable tang is shown and described in U.S. Pat. No. 6,067,208 ("Adjustment Feature for Load/Unload Alignment Ramp Assembly") issued to Peter Raymond Segar on May 23, 2000, also assigned to Seagate Technology LLC.

Figure 3:
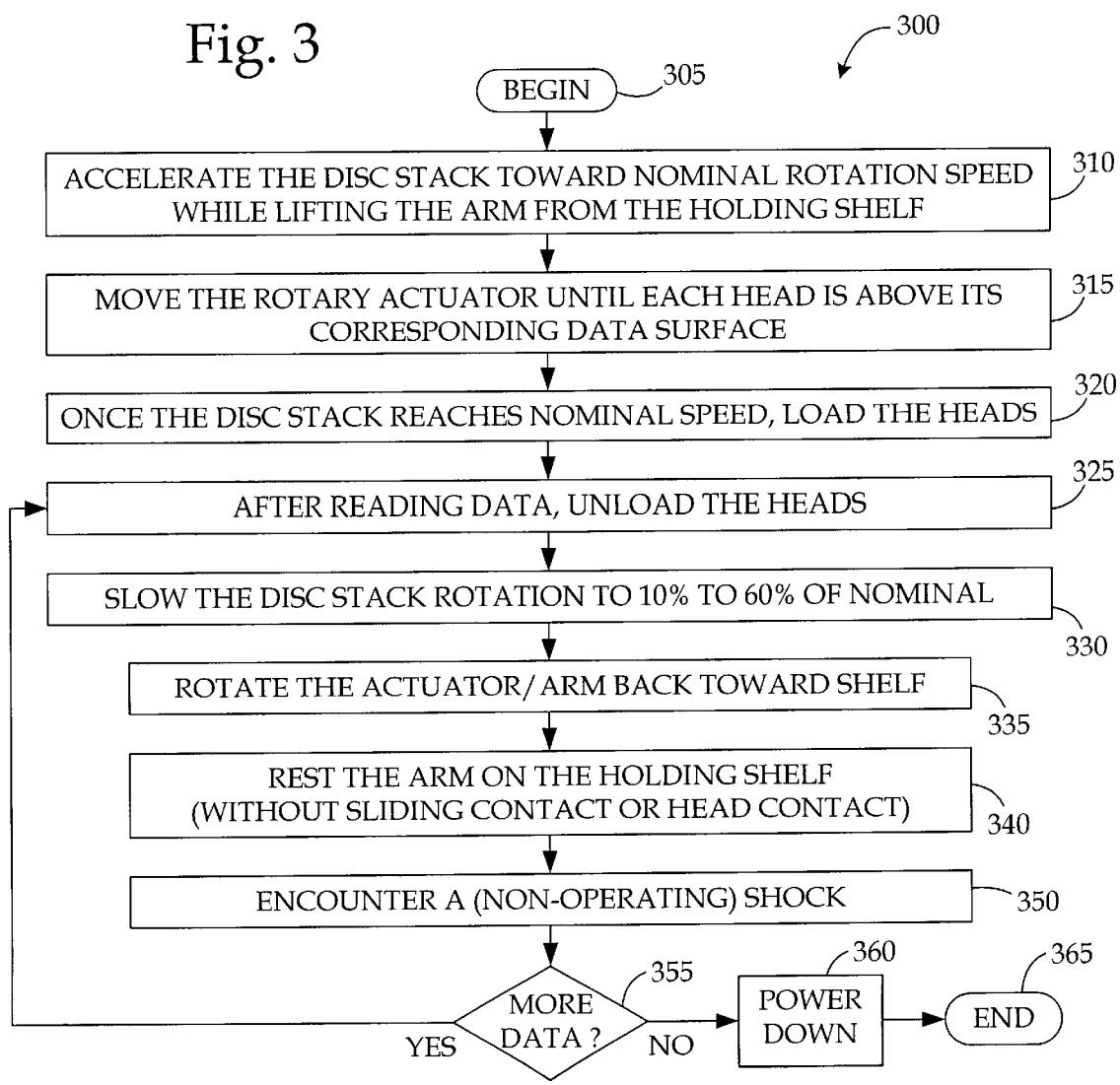
FIG. 3 shows a flowchart of a method of the present invention, usable with the data storage apparatus of FIGS. 1 & 2.

FIG. 3 shows a flowchart of a method 300 of the present invention, usable with the device of FIGS. 1 & 2, comprising steps 305 through 365. The disc stack is accelerated toward a nominal rotation speed (e.g. 7200 revolutions per minute) as the arm is lifted 310 from a support such as holding shelf. The actuator is then rotated so that each head is above its corresponding disc surface 315. After the disc stack reaches nominal speed, the head are loaded onto the disc surfaces. The initial set down is preferably above a region that does not contain user data, to avoid media damage and data losses due to incidental contact.

After the the desired data is transferred, the heads are unloaded 325 (i.e. lifted from the disc surfaces). As with the loading step 320, the initial lift is preferably performed above a region that does not contain user data. Once the heads are at least several microns away, the discs begin a deceleration 330 toward a speed that is preferably a fraction of the nominal rotation speed. The actuator arm simultaneously rotates 335 back towards the shelf, and is rested on the shelf 340. Unlike a contact stop or ramp unload, this is performed without any substantial sliding contact or head contact. Once on the shelf, the drive may undergo a shock 350 much larger than can be withstood while operating. This is a desirable safeguard to perform for a drive that is in a standby mode, ready to transfer more data 355 or to power down 360.

Figure 4:
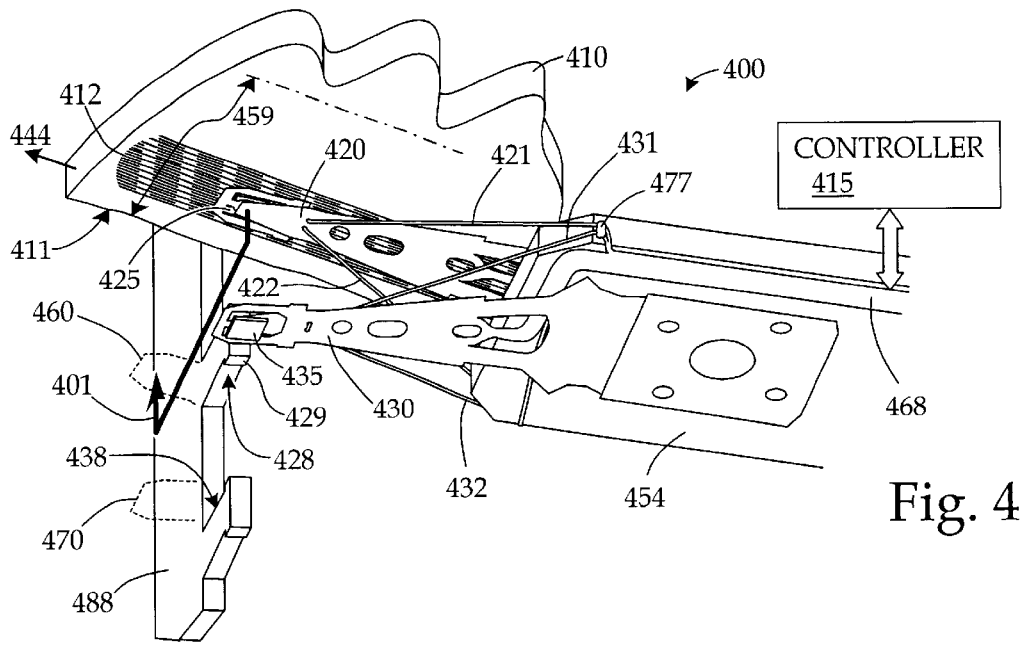
FIG. 4 shows a highly magnified view of another disc-based data storage apparatus of the present invention.

FIG. 4 shows a highly magnified view of another disc-based data storage apparatus 400 of the present invention (e.g., a multi-disc servo pattern writer or a disc drive). Features shown in FIG. 4 are to substantially to scale, except as necessary for clarity. Part of an outermost annular portion 459 of disc 410 is shown. The annular portion 459 is narrower than 1% of the radius of the disc 410, and is bounded by the circumference 411. The disc is rotating in the direction indicated at 444.

Flying adjacent disc 410 is a first head 425 supported by a first arm 420. A second arm 430 supports a second head 435 flying adjacent a second disc (not shown). Both arms shown include an arm portion 454 of a rotary actuator, the remainder of which is not shown. A pair of shape memory wires 421,422 each affixed by epoxy 477 at both ends control the fly height of first head 425 above disc 410. A load beam of the arm is biased toward disc 410 so that the shape memory wires 421,422 are in tension. When the wires are energized, they shorten so that head 425 is lifted off disc 410. The actuator can then rotate arm 420 out from between the discs, and in between two surfaces 428,438 of a shelf structure 488 supported from above (e.g. by affixation to the top cover of a Winchester-type disc drive). From this rotary position, the wires 421,422 are de-energized so that arm 420 comes to rest on shelf surface 428. In this way, arm 420 is made to move substantially along path 401 so that it comes to rest at position 460. Shape memory wires 431,432 of second arm 430 are similarly and simultaneously controlled to place arm 430 at position 470. Note that each shelf surface 428 includes a protruding locking feature 429 that strongly resists actuator rotation and limits sliding when the arms 420,430 are at rest against the shell structure 488. This locking feature is fast-acting and generates high torque. It can be used in lieu of a conventional inertial latch in some cases.

An electrical bus 468 provides power and communication from a controller 415 to heads 425,435 and also to the shape memory wires 421,422. The wires 421,422 are not merely connected in series. A conductor in the bus (not shown) is coupled to both distal ends of the shape memory wires 421,422. A voltage driven on that conductor can selectively cause one of the wires 421,422 to carry more current than the other 422,421. In this way, a static roll position of each head can be controlled selectively.

Figure 5:
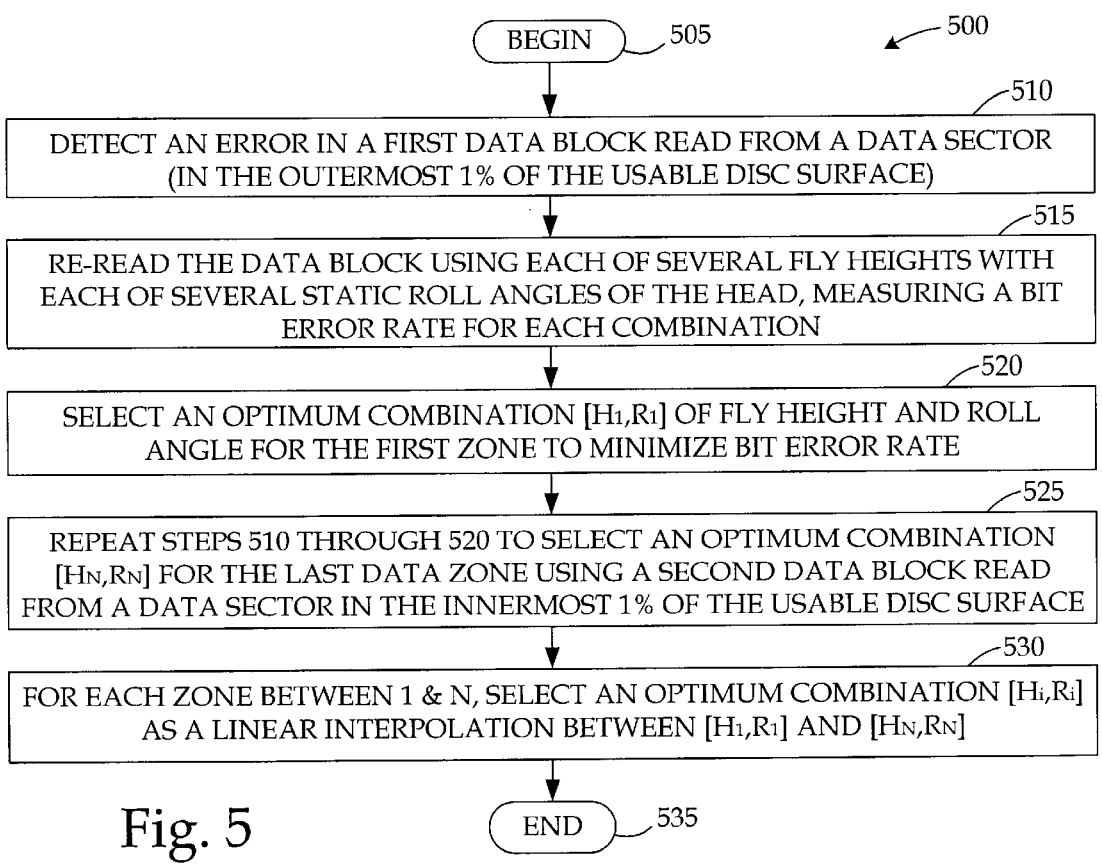
FIG. 5 shows a method of transferring data consistent with FIG. 3 and usable with the device of FIG. 4.

FIG. 5 shows another method 500 of the present invention, comprising steps 505 through 535, that takes advantage of this selective control feature. An error is found in a data block read from the outermost 1% of the usable disc surface 510. The data block is re-read using a variety of fly heights and/or static roll angles, measuring a bit error rate for each combination 515. Preferably, each bit error rate is derived as an average of several measurements. In this way, an optimum arm position (i.e. fly height $H_1$ and/or roll angle $R_1$) for the outermost (first) zone is detected 520. This process is repeated for the innermost (Nth) zone 525. For each of the annular zones 2 through N-1, an interpolated or similarly measured value for $H_i$ and/or $R_i$ is used.

Alternatively characterized, a first embodiment of the present invention is a method (such as 300) of operating a data storage apparatus (such as 100). The apparatus comprises a first rotary actuator (such as 130), a first stack of data storage discs (such as 110) and a first holding shelf (such as 170). The rotary actuator comprises a first arm (such as 190) coupled to a first transducer head (such as 131). The method comprises several steps generally performed while the disc stack rotates.

First, a lift actuator is used to separate the arm vertically from the holding shelf (e.g. by step 310). The actuator next moves the head over its data surface (e.g. by step 315) so that it can be lowered toward the surface (e.g. by step 320). After carrying out data transfer commands, the arm is raised again (e.g. by step 325) and rotated back toward the arm's parking location (e.g. by step 335) to be parked (e.g. by step 340). Meanwhile the disc stack is permitted to spin down (e.g. by step 330) for "standby mode" power conservation, preferably without braking. This method provides a high degree of protection against shock in a standby mode, with less particle generation than methods of the prior art. It is preferably performed, as illustrated in FIGS. 3 & 4, without any substantial sliding contact upon the arm, head, or disc.

In a second embodiment, the method includes a step (e.g. by step 510) of reading a portion of the data from a radial position less than R/100 from a circumference of the disc, where R is a nominal radius of the disc(s). Note that disc snubber tabs (such as 173) are tapered to recede from each disc surface by a few degrees so that they overlap but do not contact the outermost data tracks (such as 412). From this outermost annular zone of the data surface, an error-containing data block is re-read at several selected gram load and static roll angle values (e.g. by step 515). An optimum gram load/roll angle combination is selected (e.g. by step 520) so as to minimize a bit error rate in that zone.

In a third embodiment, this process is repeated for a data block read from a radial position less than R/50 from a piece of the stack protruding higher than the first disc (e.g. by step 525). This optimum gram load/roll angle combination is preferably selected for bit error rate lower than the bit error rate initially found in the data block. For expedience, gram load and roll angle can each be determined for other zones within the data surface as an interpolation of these values at the innermost and outermost zones (e.g. by step 530).

A fourth embodiment of the present invention is a data storage apparatus (such as 100,400) includes a slider supporting a transducer head (such as 131,425), the slider supported by an arm of a rotary actuator (such as arm 190 of actuator 130). The apparatus also includes a rotatable stack comprising discs (such as 110,410) and a support element (such as 170,488) fixedly supported by a base. The support element is constructed and arranged to receive the arm without any sliding contact acting upon the arm. This allows the stack to maintain rotation at a nominal speed or a slower speed (e.g. by step 330). This is a significant energy savings, especially if the apparatus is a portable computer or if the stack contains multiple discs.

In a fifth embodiment, the apparatus is a Winchester-type magnetic disc drive containing a disc having a nominal radius R and a data surface accessible by the transducer head. The disc surface has data tracks within innermost and outermost annular portions of the disc each narrower than R/70 (such as item 412 and 459 of FIG. 4 and those in step 525 of FIG. 5). Note that one or both of these regions are normally not used in conventional Winchester-type magnetic disc drive.

In a sixth embodiment, the apparatus includes a first thermal actuator (such as 191,421) constructed and arranged to remove the arm from a recessed holding shelf surface (such as 428) when powered and to permit the arm to maintain compressive contact with the holding shelf when unpowered. The surface is recessed so that it latches the arm within the recess and so that the arm thereby resists a horizontal rotational shock upon the base. Note that FIG. 4 shows a configuration of opposing recessed surfaces that can withstand a simultaneous vertical shock and still have one arm (either 420 or 430) remain in full contact with its respective surface. Note also that an apparatus of the sixth embodiment preferably includes a second thermal actuator (such as 422) constructed and arranged to oppose a twisting motion induced by the first thermal actuator selectively so as to control a roll angle of the first head (i.e. 425). This configuration includes a controller (such as 415) configured to control the first and second thermal actuators independently so as to control the static roll angle between the transducer head and the data surface.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, while the various embodiments of the present invention have been described with respect to a disc drive, the present invention is also applicable to, and may be implemented in, other data storage devices such as optical disc drives and multi-disc servowriters. Numerous other changes may be made which will readily suggest themselves to those skilled in the art and which are encompassed in the spirit of the invention disclosed and as defined in the appended claims.

What is claimed is:

1. A data storage apparatus comprising:
   a first rotary actuator having a first arm coupled to a first transducer head;
   a first disc stack comprising at least one disc having a data surface configured to be accessed by the first transducer head;
   a receiver for receiving the first arm substantially without sliding contact therewith, irrespective of a rotation of the first stack; and
   a secondary actuator configured to separate the first arm from the receiver by moving the arm in a direction away from the data surface.

2. The apparatus of claim 1 in which the stack includes a plurality of data storage discs.

3. The apparatus of claim 1 in which the stack includes a disc having a nominal radius R and a data surface accessible by the transducer head, the data surface having a track within an outermost annular portion of the disc narrower than R/70.

4. The apparatus of claim 1 in which the receiver comprises a first holding shelf.

5. The apparatus of claim 4 in which the actuator comprises a first thermal actuator constructed and arranged to separate the arm from the holding shelf when powered and to permit the arm to maintain contact with the holding shelf when unpowered.

6. The apparatus of claim 5 in which the secondary actuator further comprises a second thermal actuator constructed and arranged to oppose a twisting motion induced by the first thermal actuator selectively so as to control a roll angle of the first head.

7. The apparatus of claim 4 in which the holding shell is configured to support the arm so that the head does not touch the holding shelf.

8. The apparatus of claim 1 in which the data storage apparatus is a Winchester-type magnetic disc drive further comprising a base that supports the rotary actuator, the disc stack, and the receiver.

9. The apparatus of claim 8 in which the receiver includes a recessed portion configured to receive the arm, the recessed portion latching the arm therewithin so as to resist a horizontal rotational shock upon the base.

10. The apparatus of claim 8 in which the at least one disc has a nominal radius R, in which the stack also includes a layer in compressed contact with the disc, and in which the data surface has a track within R/70 of the layer.

11. A method of operating the data storage apparatus of claim 1, the method comprising steps of:
   (a) rotating the disc stack;
   (b) separating the arm from the receiver;
   (c) after completing the separating step (b), moving the rotary actuator until the head is above the data surface;
   (d) lowering the head toward the surface; and
   (e) transferring data through the head.

12. A method of operating a data storage apparatus, the apparatus comprising a first rotary actuator, a first disc stack and a first holding shelf, the rotary actuator comprising a first arm coupled to a first transducer head, the stack comprising at least a first disc having a first data surface configured to be accessed by the first transducer head, the method comprising steps of:
   (a) rotating the disc stack;
   (b) separating the arm from the holding shelf by moving the arm in a direction away from the first data surface;
   (c) after completing the separating step (b), moving the rotary actuator until the head is above the data surface;
   (d) lowering the head toward the surface;
   (e) transferring data through the head;
   (f) raising the head away from the surface;
   (g) moving the rotary actuator so that the arm moves toward the holding shelf; and
   (h) resting the arm on the holding shelf.

13. The method of claim 12 in which the transferring step (e) includes steps of:
   (e1) detecting an error in a data block read from a data sector on the data surface;
   (e2) adjusting a fly height of the head;
   (e3) re-reading the data block from the data sector; and
   (e4) generating an indication of whether the error was present in the re-read data block.

14. The method of claim 12 in which the transferring step (e) includes steps of:
   (e1) detecting an error in a data block read from a data sector on the data surface;
   (e2) adjusting a roll angle of the head; and
   (e3) re-reading the data block from the data sector.

15. The method of claim 12 in which the transferring step (e) includes a step (e1) of reducing a bit error rate by adjusting a static roll angle of the head relative to the surface.

16. The method of claim 12 in which the resting step (h) begins before the rotating step (a) is complete.

17. The method of claim 12 in which each of the steps (a) through (h) is performed without any substantial sliding contact upon the arm or upon the head.

18. The method of claim 12, further comprising steps of
   (i) encountering a non-operating shock after the resting step (h) while sustaining the rotating step (a); and
   (j) after the encountering step (i), repeating the steps (b) through (h) while sustaining the rotating step (a).

19. The method of claim 12 in which the resting step (h) is performed so that the head does not touch the holding shelf.

20. The method of claim 12 in which the transferring step (e) includes a step (e1) of reading a portion of the data from a radial position less than R/100 from a circumference of the disc, where R is a nominal radius of the disc.

21. The method of claim 12 in which the transferring step (e) includes a step (e1) of reading a portion of the data from a radial position less than R/50 from a piece of the stack protruding higher than the first disc, where R is a nominal radius of the disc.

* * * * *